United States Patent
Asai

(10) Patent No.: US 7,441,040 B2
(45) Date of Patent: Oct. 21, 2008

(54) MOVING-IMAGE STREAMING SYSTEM

(75) Inventor: Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 805 days.

(21) Appl. No.: 10/376,259

(22) Filed: Mar. 3, 2003

(65) Prior Publication Data

US 2003/0177256 A1    Sep. 18, 2003

(30) Foreign Application Priority Data

Mar. 13, 2002    (JP)    ............... 2002-067797

(51) Int. Cl.
 *G06F 15/16* (2006.01)
 *G06F 15/173* (2006.01)
(52) U.S. Cl. ............... 709/231; 709/203; 709/226; 709/230; 709/235; 709/238
(58) Field of Classification Search ............... 709/203, 709/226, 230–231, 235, 238
See application file for complete search history.

(56) References Cited

U.S. PATENT DOCUMENTS

| | | | |
|---|---|---|---|
| 6,594,798 B1 * | 7/2003 | Chou et al. ............... | 714/820 |
| 6,718,359 B2 * | 4/2004 | Zisapel et al. ............. | 718/105 |
| 6,795,434 B1 * | 9/2004 | Kumar et al. .............. | 370/392 |
| 6,826,610 B1 * | 11/2004 | Sakakura ................... | 709/226 |
| 6,832,253 B1 * | 12/2004 | Auerbach .................. | 709/226 |
| 7,058,809 B2 * | 6/2006 | White et al. ............... | 713/176 |
| 7,123,620 B1 * | 10/2006 | Ma ......................... | 370/395.32 |
| 7,127,492 B1 * | 10/2006 | Calo et al. ................. | 709/214 |
| 7,315,541 B1 * | 1/2008 | Housel et al. .............. | 370/392 |
| 2001/0018709 A1 * | 8/2001 | Kriegsman ................ | 709/226 |
| 2002/0007413 A1 * | 1/2002 | Garcia-Luna-Aceves et al. . | 709/229 |
| 2002/0095582 A1 * | 7/2002 | Peled et al. ................ | 713/180 |
| 2003/0004998 A1 * | 1/2003 | Datta ....................... | 707/513 |
| 2003/0023747 A1 * | 1/2003 | Fouquet et al. ............. | 709/238 |
| 2003/0046422 A1 * | 3/2003 | Narayanan et al. .......... | 709/238 |
| 2003/0126197 A1 * | 7/2003 | Black et al. ................ | 709/203 |
| 2003/0177183 A1 * | 9/2003 | Cabrera et al. ............. | 709/204 |
| 2004/0068576 A1 * | 4/2004 | Lindbo et al. .............. | 709/232 |
| 2005/0262529 A1 * | 11/2005 | Neogi et al. ............... | 725/31 |
| 2008/0040740 A1 * | 2/2008 | Plotnick et al. ............. | 725/32 |
| 2008/0072232 A1 * | 3/2008 | O'Toole, Jr. ............... | 718/104 |

FOREIGN PATENT DOCUMENTS

| | | |
|---|---|---|
| JP | 8-130551 A | 5/1996 |
| JP | 11-313059 A | 11/1999 |
| JP | 2001-223693 A | 8/2001 |
| JP | 2002-9828 A | 1/2002 |

* cited by examiner

*Primary Examiner*—Nathan J. Flynn
*Assistant Examiner*—Joshua Joo
(74) *Attorney, Agent, or Firm*—Birch, Stewart, Kolasch & Birch, LLP

(57) ABSTRACT

Moving-image data is streamed to a large number of client computers even though line band of a streaming server is kept narrow. To achieve this, the address of a relay server closer to a client computer than is the streaming server is transmitted when the client computer issues the streaming server a connection request for moving-image data. The client computer then sends this relay server a request to transmit the moving-image data. When this occurs, the address of another relay server even closer to the client computer than is the first-mentioned relay server is transmitted to the client computer. Since this other relay server is closest to the client computer, moving-image data is streamed from this relay server to the client computer.

2 Claims, 4 Drawing Sheets

MOVING-IMAGE STREAMING SYSTEM

BACKGROUND OF THE INVENTION

1. Field of the Invention

This invention relates to a system for streaming moving-image data, and to a streaming server and relay server that constitute this system. In this embodiment, "streaming" refers to the real-time transmission of received data and signifies a transmission that enables multiple users (client computers) to view the same scene when these multiple users receive data that is being transmitted.

2. Description of the Related Art

The transmission of very great quantities of moving-image data has become a reality with the ever increasing use of broadband over the Internet. However, the though line usage fee at the terminal of a broadband Internet line such as an ADSL (Asymmetric Digital Subscriber Line) is low, line usage fee on the server side that transmits a very large quantity of moving-image data is still high where broadband is concerned.

For example, assume that the data receive rate of a client computer is on the order of 1.5 Mbps (megabits per second). When moving-image data is transmitted from a server to 1000 of such client computers in this case, it is necessary that the speed at which data is transmitted from the server be made 15 Gbps. The usage fee of such a high-speed line is high.

It is necessary, therefore, that broadband be achieved on a terminal line while the band of a line on the server side is suppressed.

SUMMARY OF THE INVENTION

Accordingly, an object of the present invention is to achieve broadband on a terminal line while suppressing the band on the server line.

According to the present invention, the foregoing object is attained by providing a moving-image streaming system that includes a streaming server and a plurality of relay servers.

The streaming server includes a determination device (first determination means) responsive to a request from a client computer for determining whether the plurality of relay servers includes a first relay server having a path from itself to the client computer that is shorter than a path from the streaming server to the client computer; a first transmitting device for streaming moving-image data to the client computer in response to a determination by the determination device that the first relay server is non-existent; and a second transmitting device for streaming moving-image data to the first relay server in response to a determination by the determination device that the first relay server exists.

Each of the plurality of relay servers includes a third transmitting device for streaming moving-image data, which has been streamed from the second transmitting device of the streaming server, to the client computer or to another relay server exclusive of the first relay server in accordance with length of the path to the client computer.

In accordance with the present invention, data representing a request for moving-image data is transmitted from a client computer to a streaming server.

When the streaming server receives the data representing the request for moving-image data, the streaming server determines whether there exists a relay server whose path to the client computer that requested the moving-image data is shorter than the path from the streaming server to this client computer.

If the relay server having the shorter path (namely a first relay server) exists, then moving-image data is streamed from the streaming server to the first relay server. The moving-image data is then streamed from the first relay server to the requesting client computer. Since not only the streaming server but also the relay server (first relay server) stream moving-image data, the band of the streaming-server line need not be widened in accordance with the number of client computers that request moving-image data. This makes it possible to transmit moving-image data using a comparatively inexpensive line.

If a relay server having a shorter path does not exist, then the streaming server transmits the moving-image data to the requesting client computer.

Further, the first relay server can be provided with a second determination device for determining whether the plurality of relay servers includes a second relay server having a path from itself to the client computer that is shorter than the path from the first relay server to the client computer; a fourth transmitting device for streaming streamed moving-image data to the client computer in response to a determination by the second determination device that the second relay server is non-existent; and fifth transmitting device for streaming streamed moving-image data to the second relay server in response to a determination by the second determination device that the second relay server exists.

Each of the plurality of relay servers may also have a sixth transmitting device for streaming moving-image data, which has been streamed from the fifth transmitting device of the streaming server, to the client computer.

The streaming server and relay servers constructing the above-described moving-image streaming system may each be constructed independently of each other.

Such a relay server may have a receiving device for receiving streaming moving-image data; a detecting device for detecting a relay server having a path shorter than a path to a client computer that has requested streaming of moving-image data; and a transmitting device for streaming the moving-image data, which has been received by the receiving device, to the relay server detected by the detecting device.

A method of controlling the above-described relay server also is provided. Specifically, the method comprises the steps of receiving moving-image data that is being streamed; detecting a relay server having a path shorter than a path to a client computer that has requested streaming of moving-image data; and streaming the moving-image data, which has been received, to the relay server detected.

Further, the streaming server includes a determination device responsive to a request from a client computer for determining whether the plurality of relay servers includes a first relay server having a path from itself to the client computer that is shorter than a path from the streaming server to the client computer; a first transmitting device for streaming moving-image data to the client computer in response to a determination by the determination device that the first relay server is non-existent; and a second transmitting device for streaming moving-image data to the first relay server in response to a determination by the determination device that the first relay server exists.

A method of controlling the above-described streaming server also is provided. Specifically, the method comprises the steps of determining, in response to a request from a client computer, whether the plurality of relay servers includes a first relay server having a path from itself to the client computer that is shorter than a path from the streaming server to the client computer; streaming moving-image data to the client computer in response to a determination by the determination device that the first relay server is non-existent; and streaming moving-image data to the first relay server in response to a determination that the first relay server exists.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
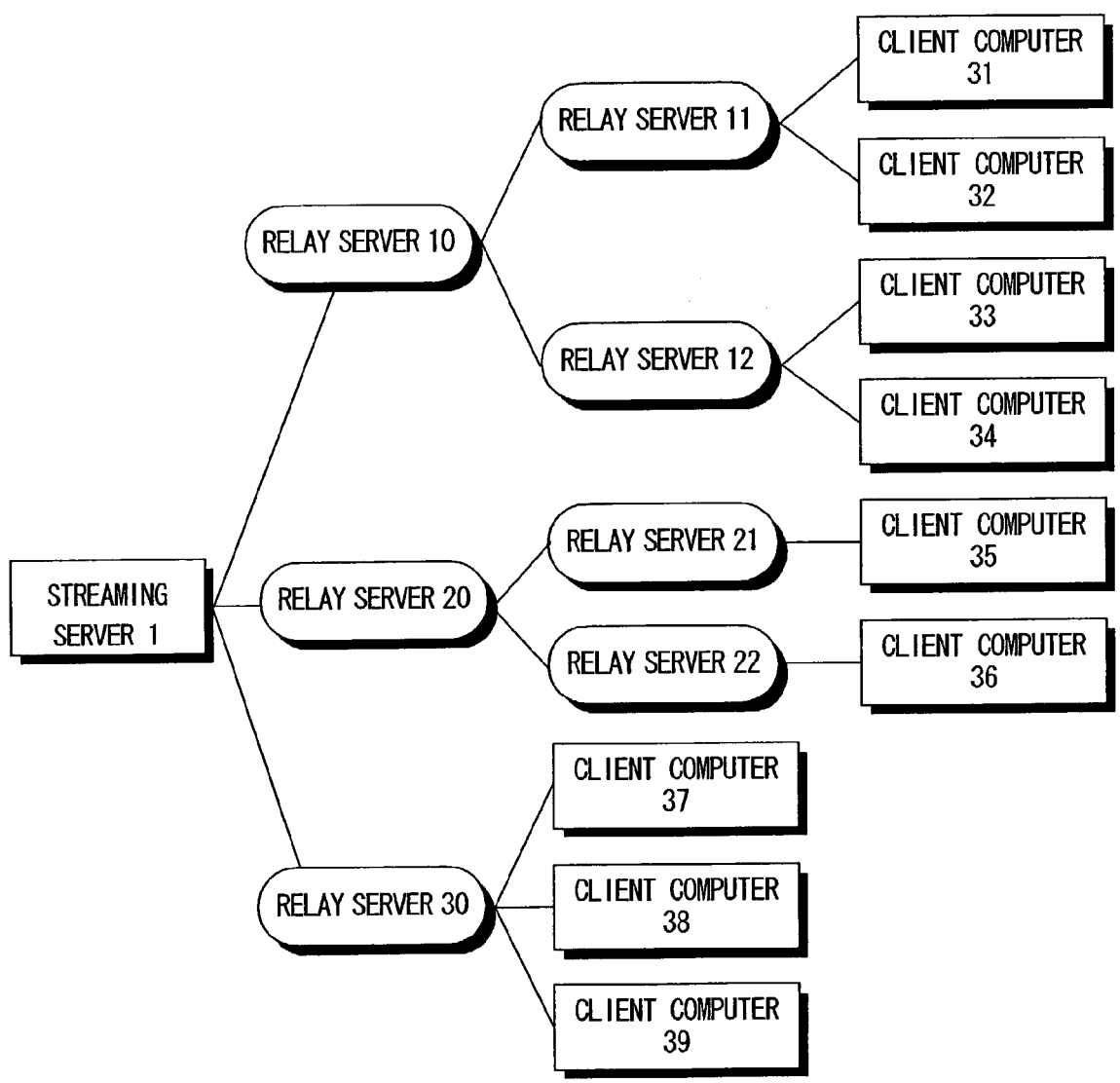
FIG. 1 is a block diagram illustrating the configuration of a moving-image streaming system according to the present invention.

FIG. 1 illustrates the configuration of a moving-image streaming system according to a preferred embodiment of the present invention.

The moving-image streaming system comprises a streaming server 1, which includes a CPU, a memory, a communication circuit, a display unit and an input unit, etc., a number of relay servers 10, 11, 12, 20, 21, 22 and 30, and a number of client computers 31, 32, 33, 34, 35, 36, 37, 38 and 39.

In FIG. 1, the manner in which these devices (streaming server, relay servers and client computers) are connected (communicate with one another) is indicated by the solid lines, though it goes without saying that devices other than those connected by the solid lines also can be connected together. Of course, it is acceptable if client computers cannot always be connected together directly.

In the moving-image streaming system according to this embodiment, the user of a client computer attempting to receive moving-image data first effects a connection to the streaming server 1. In a case where there is a relay server whose path from the streaming server 1 is shorter than the path from the connect-requesting client computer to the streaming server 1, moving-image data is streamed from the streaming server to this relay server and then the moving-image data is streamed from this relay server to the client computer.

For example, assume that the client computer 31 requests the streaming server 1 for streaming of moving-image data. Assume also that the distance (path) from the streaming server 1 to the relay server 11 is shorter than that to the client computer 31 and that the distance (path) from streaming server 1 to the relay server 10 is shorter than that to the relay server 11. If the client computer 31 issues a connection request for moving-image data to the streaming server 1 in such case, then the address of the relay server 10, which is closer to the client computer 31 than is the streaming server 1, is transmitted from the streaming server 1 to the client computer 31. The client computer 31 then requests the relay server 10 for streaming of the moving-image data. Now the address of the relay server 11, which is even closer to the client computer 31 than is the relay server 10, is transmitted to the client computer 31. Since the relay server 11 is closest to the client computer 31, moving-image data is streamed from the relay server 11 to the client computer 31.

By constructing the moving-image streaming system in this fashion, moving-image data can be streamed to a larger number of client computers, even though the line connected to the streaming server 1 has a narrow band, in comparison with a case where moving-image data is streamed from the streaming server 1 to all of the client computers.

The above will be clarified further by the detailed description that follows.

Figure 2:
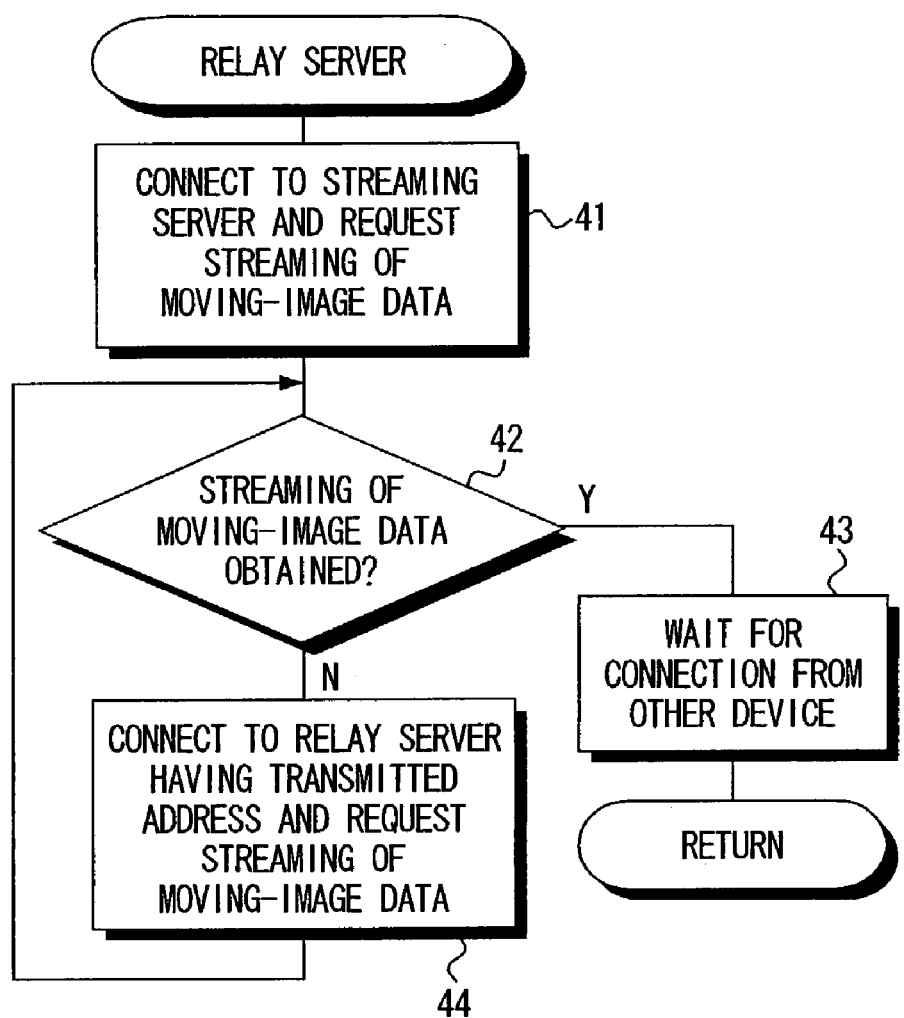
FIG. 2 is a flowchart illustrating processing executed by a relay server according to the invention.
Figure 3:
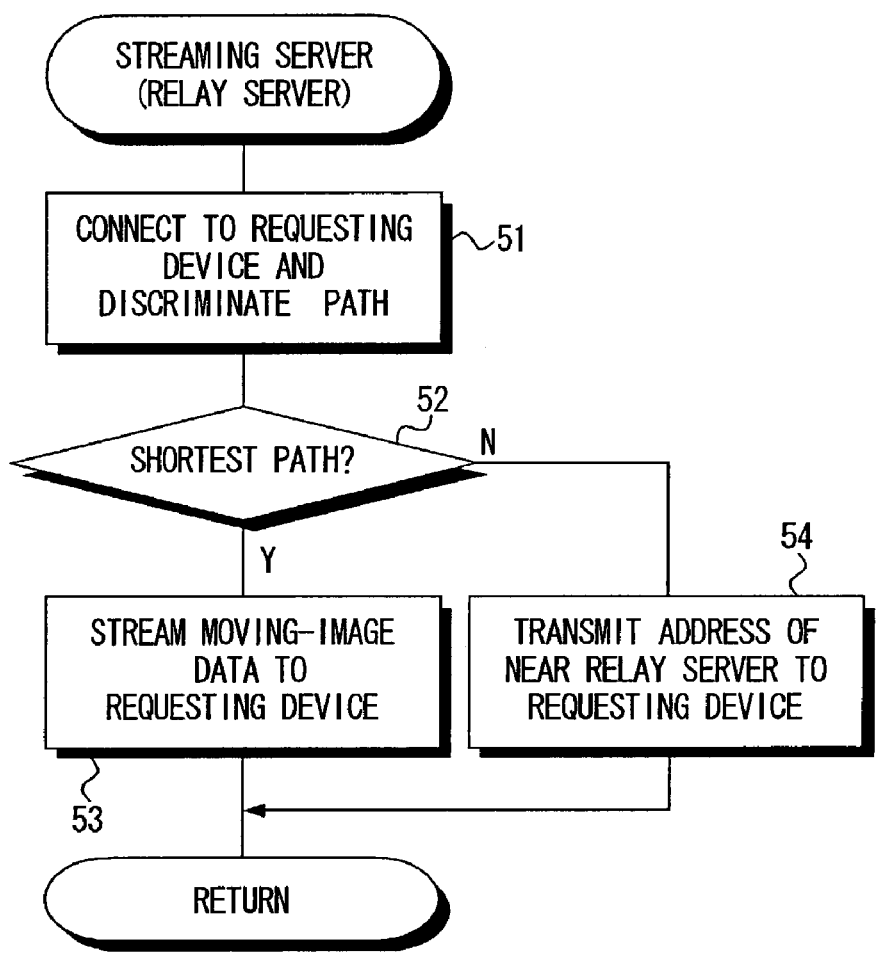
FIG. 3 is a flowchart illustrating processing executed by streaming server according to the invention.

FIG. 2 is a flowchart illustrating processing executed by a relay server in the streaming of moving-image data, and FIG. 3 is a flowchart illustrating processing executed by the streaming server.

First, the relay server is connected to the streaming server 1. When this is achieved, the relay server sends the streaming server 1 data requesting streaming of moving-image data (step 41 in FIG. 2).

When the streaming server 1 becomes connected to the relay server and the request for transmission of moving-image data is received from the relay server, the streaming server 1 determines whether the path from the streaming server 1 to this relay server is the shortest (step 51 in FIG. 3). (This determination concerning the shortest path can be made utilizing the fact that packets are transmitted to the server located on the shortest path in a case where packet transmission is performed over the Internet.) In other words, it is determined whether a relay server close to the streaming server exists between the above relay server and the streaming server 1.

If the path is the shortest path ("YES" at step 52 in FIG. 3), then moving-image data is streamed from the streaming server 1 to the requesting relay server (step 53 in FIG. 3).

If moving-image data is streamed from the streaming server 1 ("YES" at step 42 in FIG. 2), the relay server waits for a connection request from another device (step 43 in FIG. 2).

If the path is not the shortest path ("NO" at step 52 in FIG. 3), then the address of a relay server that is near the relay server that requested transmission of moving-image data and, moreover, whose path to the streaming server 1 is short is transmitted to the relay server that requested transmission of moving-image data (step 54 in FIG. 3).

If streaming of moving-image data does not take place at the relay server that requested transmission ("NO" at step 42 in FIG. 2), then this relay server receives the address of the relay server whose path to the streaming server 1 is short. The relay server is connected to the relay server having the received address, and data representing a request for moving-image data is transmitted thereto (step 44 in FIG. 2). When this occurs, the processing of steps 51 to 54 in FIG. 3 is repeated with regard to the connected relay server in the manner described above. Thus, moving-image data is received from the relay server closest to the relay server that issued the request for streaming of moving-image data to the streaming server 1. (It goes without saying that if a nearest relay server does not exist, moving-image data is streamed from the streaming server 1.)

Figure 4:
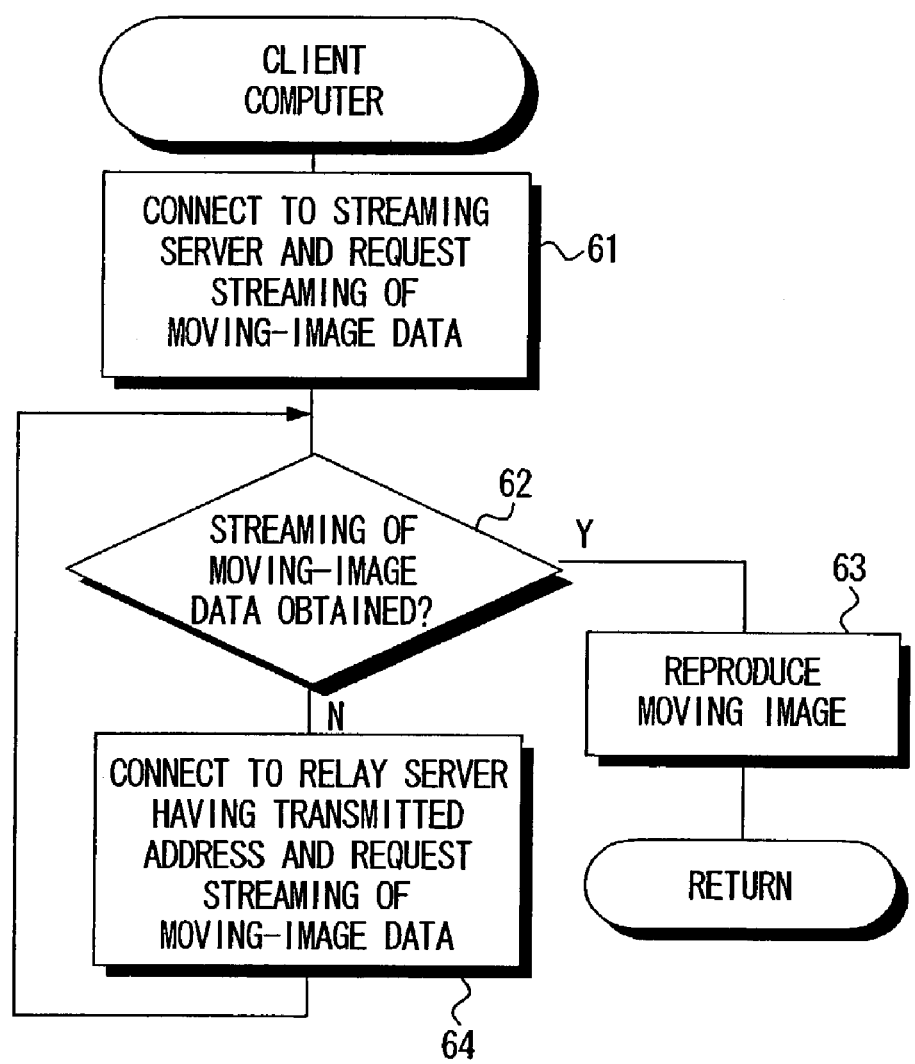
FIG. 4 is a flowchart illustrating processing executed by a client computer according to the invention.

FIG. 4 is a flowchart illustrating the processing executed by a client computer.

Processing by the client computer is substantially the same as the above-described processing (FIG. 2) executed by the relay servers.

As shown in FIGS. 4 and 3, the client computer and the streaming server 1 are connected and data representing a request for moving-image data is transmitted from the client computer to the streaming server 1 (step 61 in FIG. 4).

In a manner similar to that described above, it is determined whether a relay server whose path from the streaming server is shorter than that from the streaming server to the client computer exists (steps 51, 52 in FIG. 3). If the path is the shortest path ("YES" at step 52 in FIG. 3), then moving-image data is streamed to the client computer (step 53 in FIG. 3). If the path is not the shortest path ("NO" at step 52 in FIG. 3), then the address of a relay server having the short path is transmitted to the client computer (step 54 in FIG. 3).

If the client computer receives streamed moving-image data from the streaming server 1 ("YES" at step S42), then the client computer reproduces the moving image represented by the received moving-image data (step 64 in FIG. 4). If the address of a relay server is received and not moving-image data ("NO" at step 62), processing similar to the foregoing is executed between the relay server having this address and the client computer. Thus, the client computer receives streaming moving-image data from the relay server that is closest to the client computer.

As many apparently widely different embodiments of the present invention can be made without departing from the spirit and scope thereof, it is to be understood that the invention is not limited to the specific embodiments thereof except as defined in the appended claims.

What is claimed is:

1. A moving-image streaming system comprising a streaming server and a plurality of relay servers, wherein:
    said streaming server includes:
        a first determination device responsive to a request from a client computer for determining whether said plurality of relay servers includes a relay server between said streaming server and said client computer, and having a path from said relay server to said streaming server that is shorter than a path from said streaming server to said client computer;
        a first transmitting device for streaming moving-image data to said client computer in response to a determination by said determination device that said relay server is non-existent; and
        a second transmitting device for transmitting an address of said relay server to said client computer in response to a determination by said determination device that said relay server exists;
    said relay server includes:
        a receiving device for receiving the moving-image data streamed from said streaming server in response to a request of the streaming moving-image data, and waiting for a connection request from another device;
        a second determination device responsive to the request from said client computer for determining whether another relay server, between said relay server and said client computer, has a path from said another relay server to said relay server that is shorter than a path from said relay server to said client computer;
        a third transmitting device for streaming moving-image data to said requesting client computer in response to a determination by said second determination device that said another relay server is non-existent; and
        a fourth transmitting device for transmitting an address of said another relay server to said requesting client computer in response to a determination by said second determination device that said another relay server exists.

2. A relay server comprising:
    a transmission request device for requesting a transmission of streaming moving-image data from a streaming server;
    a receiving device for receiving the moving-image data streamed from said streaming server in response to the request for the streaming moving-image data, and waiting for a connection request from another device;
    a determination device responsive to a request from a client computer for determining whether another relay server, between said relay server and said client computer, has a path from said another relay server to said relay server that is shorter than a path from said relay server to the client computer;
    a first transmitting device for streaming moving-image data to said requesting client computer in response to a determination by said determination device that said another relay server is non-existent; and
    a second transmitting device for transmitting an address of said another relay server to said requesting client computer in response to a determination by said determination device that said another relay server exists.

* * * * *